(12) United States Patent
Gonçalves (10) Patent No.: US 11,035,718 B2
(45) Date of Patent: Jun. 15, 2021

(54) EMBEDDED SYSTEM FOR MEASUREMENT OF WEIGHT AND OTHER PHYSICAL VARIABLES IN VEHICLES AND CONTAINERS

(71) Applicant: VELSIS SISTEMAS E TECNOLOGIA VIARIA S/A, Curitiba (BR)

(72) Inventor: Sergio Machado Gonçalves, Curitiba (BR)

(73) Assignee: VELSIS SISTEMAS E TECNOLOGIA VIARIA S/A, Curitiba (BR)

( * ) Notice: Subject to any disclaimer, the term of this patent is extended or adjusted under 35 U.S.C. 154(b) by 510 days.

(21) Appl. No.: 15/771,424

(22) PCT Filed: Mar. 13, 2018

(86) PCT No.: PCT/BR2018/050067
§ 371 (c)(1),
(2) Date: Apr. 27, 2018

(87) PCT Pub. No.: WO2018/165727
PCT Pub. Date: Sep. 20, 2018

(65) Prior Publication Data
US 2020/0064180 A1 Feb. 27, 2020

(30) Foreign Application Priority Data
Mar. 15, 2017 (BR) .................. 10 2017 005171 4

(51) Int. Cl.
*G01G 19/12* (2006.01)
*G01G 23/36* (2006.01)
*G07C 5/08* (2006.01)

(52) U.S. Cl.
CPC .......... *G01G 19/12* (2013.01); *G01G 23/361* (2013.01); *G07C 5/085* (2013.01)

(58) Field of Classification Search
CPC ...... G01G 19/12; G01G 23/361; G01G 19/08; G07C 5/085; G01B 11/16
See application file for complete search history.

(56) References Cited

U.S. PATENT DOCUMENTS 4,480,480 A * 11/1984 Scott ................... E02B 17/0034
                                                        702/41
5,416,706 A * 5/1995 Hagenbuch ............ G01G 19/08
                                                         177/136
(Continued)

FOREIGN PATENT DOCUMENTS

CN       2924496 Y    7/2007
CN     102243094 A   11/2011
(Continued)

OTHER PUBLICATIONS

David et al., GB 2294112 (Year: 1994).*

*Primary Examiner* — Mohammad K Islam
(74) *Attorney, Agent, or Firm* — Pilloff Passino & Cosenza LLP; Sean A. Passino; Rachel K. Pilloff (57) ABSTRACT

The present invention relates to the technical field of systems for measurement of weight load and other physical variables in vehicles and/or containers, comprising a system of sensing and monitoring of their conditions, instantaneous or not. Consists of an external data collection subsystem (SSI) with module with sensing network (1), signal transduction module (2) and connection module (3); of a data processing and reading subsystem (SSII) with energizing module (4); reading and data acquisition module (5); processing and memory module (6); and data transmission subsystem (SSIII) with data communication module (7). The system has advantages, does not present false sensor mea- (Continued)

surements, that allow wide multiplexing, no electricity, high signal and there is no electromagnetic interference, they are robust, do not suffer corrosion and do not fail due to vibration and mechanical impacts.

13 Claims, 6 Drawing Sheets (56) References Cited

U.S. PATENT DOCUMENTS

| | | | | |
|---|---|---|---|---|
| 5,657,405 | A * | 8/1997 | Fujiwara | G01D 5/268 356/225 |
| 6,144,790 | A | 11/2000 | Bledin | |
| 6,539,294 | B1 * | 3/2003 | Kageyama | E02F 3/842 180/168 |
| 6,779,796 | B2 * | 8/2004 | Carlson | B64D 3/02 273/361 |
| 6,823,728 | B1 * | 11/2004 | Barnes | G01L 17/005 73/146 |
| 7,193,512 | B1 * | 3/2007 | Coulthard | G16H 40/63 340/531 |
| 7,394,363 | B1 * | 7/2008 | Ghahramani | G06Q 10/08 340/521 |
| 7,455,225 | B1 * | 11/2008 | Hadfield | G07C 5/085 235/384 |
| 7,897,884 | B2 * | 3/2011 | Harish | G01G 7/06 177/25.13 |
| 10,093,232 | B2 * | 10/2018 | Troutman | H05B 47/20 |
| 2003/0040885 | A1 * | 2/2003 | Schoess | G01G 3/16 702/173 |
| 2003/0165398 | A1 * | 9/2003 | Waldo | A61L 2/0011 422/22 |
| 2005/0016787 | A1 * | 1/2005 | Lesesky | G07C 5/008 180/311 |
| 2005/0151069 | A1 * | 7/2005 | Beinhocker | G08B 13/126 250/227.15 |
| 2005/0167164 | A1 * | 8/2005 | Takeda | B60G 17/018 177/136 |
| 2005/0167165 | A1 * | 8/2005 | Takeda | B60G 17/019 177/136 |
| 2005/0171738 | A1 * | 8/2005 | Kadaba | G07C 5/085 702/187 |
| 2005/0256681 | A1 * | 11/2005 | Brinton | G06Q 10/06 702/182 |
| 2006/0004499 | A1 * | 1/2006 | Trego | G07C 5/085 701/31.4 |
| 2006/0048845 | A1 * | 3/2006 | Slavin | H04N 7/185 141/94 |
| 2006/0261259 | A1 * | 11/2006 | Beinhocker | G01J 1/0425 250/227.15 |
| 2006/0285440 | A1 * | 12/2006 | Dagher | G08B 13/126 367/149 |
| 2006/0291657 | A1 * | 12/2006 | Benson | G06F 21/52 380/270 |
| 2007/0006652 | A1 * | 1/2007 | Weldon, Jr. | G01M 5/0041 73/579 |
| 2007/0261894 | A1 * | 11/2007 | Harish | G01G 23/3735 177/211 |
| 2008/0011091 | A1 * | 1/2008 | Weldon, Jr. | G01K 7/32 73/766 |
| 2008/0036617 | A1 * | 2/2008 | Arms | G01M 5/00 340/679 |
| 2008/0252084 | A1 * | 10/2008 | Francis | G09F 3/0376 292/317 |
| 2009/0002187 | A1 * | 1/2009 | Kriel | G01G 19/12 340/679 |
| 2009/0115607 | A1 * | 5/2009 | Beinhocker | G08B 13/126 340/541 |
| 2009/0143923 | A1 * | 6/2009 | Breed | B60R 21/01516 701/1 |
| 2010/0206642 | A1 * | 8/2010 | Curotto | G01G 19/414 177/1 |
| 2010/0225460 | A1 * | 9/2010 | Watanabe | B60R 19/483 340/436 |
| 2010/0237851 | A1 * | 9/2010 | Coster | G01R 27/02 324/76.19 |
| 2010/0277345 | A1 * | 11/2010 | Rodriguez | G08B 13/1965 340/945 |
| 2011/0248861 | A1 * | 10/2011 | Corrado | G01B 21/26 340/666 |
| 2012/0089299 | A1 * | 4/2012 | Breed | B60N 2/888 701/36 |
| 2013/0033381 | A1 * | 2/2013 | Breed | B60T 7/16 340/568.1 |
| 2013/0198722 | A1 * | 8/2013 | Adams | G06F 9/466 717/127 |
| 2013/0213141 | A1 * | 8/2013 | Reitmann | G01M 5/0091 73/802 |
| 2013/0297154 | A1 * | 11/2013 | Burchett | B62D 53/068 701/49 |
| 2014/0266746 | A1 * | 9/2014 | Rennie | G08B 17/04 340/626 |
| 2016/0019497 | A1 * | 1/2016 | Carvajal | H04W 4/029 701/519 |
| 2016/0098869 | A1 * | 4/2016 | Rood | G07C 5/0808 701/32.7 |
| 2017/0016757 | A1 * | 1/2017 | Strong | B60G 17/017 |
| 2017/0016953 | A1 * | 1/2017 | Beer | G01R 27/28 |
| 2017/0029001 | A1 * | 2/2017 | Berggren | G01M 5/0091 |
| 2017/0313499 | A1 * | 11/2017 | Hughes | B65D 88/30 |
| 2018/0128640 | A1 * | 5/2018 | Gonzalez Mendez | G08G 1/205 |
| 2018/0201187 | A1 * | 7/2018 | Yellambalase | B60L 3/0023 |
| 2019/0120684 | A1 * | 4/2019 | Oren | G01G 3/125 |
| 2019/0154491 | A1 * | 5/2019 | Bunner | B60Q 9/00 |
| 2019/0213612 | A1 * | 7/2019 | Maugans, III | G06F 16/9537 |

FOREIGN PATENT DOCUMENTS

| | | |
|---|---|---|
| CN | 102252740 A | 11/2011 |
| WO | 2016135289 A1 | 9/2016 |

* cited by examiner

EMBEDDED SYSTEM FOR MEASUREMENT OF WEIGHT AND OTHER PHYSICAL VARIABLES IN VEHICLES AND CONTAINERS

The present invention relates to the technical field of systems for measurement of weight load and other physical variables in vehicles and/or containers in general, preferably in cargo trucks and containers, but not limited thereto, corresponding to a system of sensing and monitoring of vehicles and/or containers and their conditions, instantaneous or not. It is applicable in containers, cargo vehicles and generic passenger cars. The aim of the invention is to monitor the weight of the transported loads and the greatest number of factors that may lead to accidents, and thus alert drivers, transport companies, insurers, supervisory bodies, and so on. The invention will be described and applied preferably in cargo and/or container trucks, but it may be applied in: buses, semi-trailer, pick-ups, passenger cars, service vehicles, locomotives, wagons and buckets. The solution proposed by the system of the present invention has a number of advantages with regard to the potential integration of vehicles and containers for the monitoring of physical variables in general, does not present false sensor measurements that allow wide multiplexing, is not based on electricity, signal levels are high and there is no risk of electromagnetic interference, are robust, do not suffer from water corrosion problems and do not fail due to vibration and mechanical impacts.

On Brazilian roads, as well as in other countries, there are a number of risks that can cause accidents, amongst them we can mention: poor paving conditions; trucks with excessive weights or structural problems; the lack of mechanical revisions; amongst others.

Road transportation in Brazil is based on the workforce of freelance truckers, who in many cases, undergo to put on the truck more weight than they can hold. This excess is responsible for a number of disadvantages, limitations and drawbacks, amongst them: reducing speed on ramps and climbs, causing traffic jams and other inconveniences to drivers; impairs the braking capacity of the composition, which can lead to major accidents, especially on more dangerous roads and in challenging climatic conditions; impairs the maneuverability of trucks, another factor that can lead to accidents; the poor design of the axle load raises the consumption and reduces the performance of the trucks, also increasing the emission of pollutants; other damage to the truck may occur, such as shaft stability problems, increased consumption of spare parts and damaged tires; besides contributing with the deformation and damages in the paving of the road.

Load trucks carrying goods in containers; dump trucks; box trucks; tank trucks; flat bed trucks; amongst others, are obliged by law to pass through weighing stations, in order to verify the weight transported. In theory, this inspection would prevent the truck from traveling with a load and/or weight above the specified one. However, the high cost of manufacturing, and maintenance of these stations led to the disinterest of the responsible agencies, which, instead of keeping them functioning, are closing and abandoning the units.

For the specific measurement of weight embedded on vehicles, there are two solutions that have been proposed and/or are currently employed. The first consists in measuring the pressure of the damping system and consequently in the variation of the pressure of the shock absorbers with the loading of the vehicles as well as in their operation. The main drawback of this technology is the need for coupling to the shock absorber pressurizing system which is not always available for all vehicle models. In addition, false measurements are generated whenever some failure, however small, detectable or not, occurs with the shock absorbers. The other method of detecting vehicle weight is the use of strain gauges that monitor the structure of the vehicle and the mechanical stresses generated by the loading and use of the vehicle. The great disadvantage of this technology is the strain gauges themselves that do not allow wide multiplexing and always require, for each individual element, a pair of wires. Additionally, since this technology is based on electricity, and signal levels are low and of lower power, there is always the risk of electromagnetic interference. Chemical and mechanical strengths are still weaknesses of strain gauges, which suffer from water corrosion problems and may fail due to vibration and mechanical impacts.

Searching the Brazilian and international patent banks, we find the following revelations:

US20090143923, which describes and claims a device for monitoring the weight of a transport container by means of a system of sensors of the strain gauge type for performing deformation measurements and obtaining information on the weight of a transport container and its contents.

US20090143923 differs from the proposed invention by allowing monitoring of load weight only, and using strain gauge type sensors, which are difficult to install and maintain.

In U.S. Pat. No. 6,144,790 A optical fiber sensor is provided which is useful for detecting impact, pressure or other forces, and has particular application in detecting the presence of a foreign object in an electronically operated vehicle window including a motor, a frame and a window pane movable in the frame between an open and a closed position. The sensor comprises a optical fiber having one end connected to a light source, with the other end being connected to a detector. In the optical fiber, there is located a sensing portion fiber which is preferably located in the frame of the window so as to modulate light traveling in an optical path in the optical fiber in response to detection of the foreign object which comes into contact therewith. The sensor further comprises a signal propagating means for transmitting a signal to the motor when the optical path is modulated so as to stop or reverse the motor.

This patent presents the primary concept of the application of optical fiber sensor in the detection of objects that prevent the movement of the window of a vehicle, however the principles of sensing used are rudimentary and transform the optical fiber simply into a digital channel (ON/OFF) indicating the presence or not of the blocking object, thus not exerting the measurement function by itself.

Chinese patent CN 102252740A—The invention discloses a vehicle dynamic weighing sensor. The vehicle dynamic weighing sensor comprises an optical fiber microbend-elastic oil pipe, an optical fiber raster-hydraulic sensor, first transmission optical fiber, second transmission optical fiber, third transmission optical fiber, fourth transmission optical fiber, a light intensity demodulation module, The invention relates to an optical wavelength-modulating device and a restrictor valve, wherein the emitted by the light intensity modulus is introduced from the first optical fiber transmission to the optical fiber. light intensity demodulation module; laser emitted by the optical wavelength demodulation module is introduced from the third optical fiber transmission to the optical fiber raster-hydraulic sensor and then is led out by the fourth optical fiber transmission to the optical wavelength demodulation module; at least one overflow hole is formed in the restrictor valve; and the optical fiber microbend-elastic oil pipe is communicated with the optical fiber raster-hydraulic sensor through the restrictor valve. The vehicle dynamic weighing sensor has high anti-electromagnetic interference capacity, accurate measurement and high durability, is convenient to carry and realizes remote monitoring easily.

Chinese patent CN102243094A—The invention discloses an optical fiber-hydraulic combined dynamic vehicle weighing device. The optical fiber-hydraulic combined dynamic vehicle weighing device is characterized by comprising an optical fiber microbend sensor (1), an optical fiber hydraulic sensor (2) connected with the optical fiber microbend sensor (1), a hydraulic oil pump (3) connected with the optical fiber microbend sensor (1) through a first connecting oil pipe (4), a first light intensity demodulation module transmitting optical fiber (1-4) and a second transmitting optical fiber (1-5), and a second light intensity demodulation module (7) connected with the optical fiber hydraulic sensor (2) through a third) and a fourth transmitting optical fiber (2-11); The stability and reliability of the optical fiber-hydraulic combined dynamic vehicle weighing device are improved.

The above cited patents CN102252740A and CN102243094A make remote hydraulic pressure measurement using micro-bending optical fiber sensors.

Chinese patent CN2924496—The utility model relates to a dynamic weigher for shaft of fiber grating vehicle, which comprises a laser source. The terminal of the laser source is connected to a first end of fiber coupler, and to the third end of the fiber coupler is connected with wavelength demodulating module of the fiber grating, photoelectric converting module, data acquiring equipment and industrial PC in a machine shell. Hydraulic pressure sensing element is made up of fiber grating pressure sensing head, hydraulic valve set and hydraulic hose. The fiber grating pressure sensing head is made by epoxy polyester to fasten fiber on two sides of the sensing grating on a metal flexible shim, and the shim is attacked on the hydraulic valve set which is communicated with the hydraulic hose. Second end of the fiber coupler is connected with fiber of the sensing optic grating. The utility model has the advantages of high reliability, low cost, quick measurement and easy carrying out remote control.

The system proposed by this invention consists of a hydraulic pressure sensor, as so many others realized with optical fiber sensors, and the weight measurement occurs indirectly through the measurement of pressure in the hydraulic system of the vehicle. This type of measurement has the main disadvantage of being dependent on the operational state of the hydraulic system and consequently being dependent on maintenance conditions.

The European patent WO2016135289—The invention relates to an improved sensor device (S) for detecting mechanical vibrations and/or other mechanical effects on an examination object (10), in particular a vehicle and/or component of a vehicle, preferably a tire, the sensor device (S) comprising a optical fiber interferometer, in particular a ring interferometer.

The system proposed by this invention is employed for pressure measurement in tires, and from the measurements of pressure fluctuations it establishes correlations with impacts and mechanical vibrations. While this type of system can be used to infer the weight of the vehicle, it suffers from the same problems mentioned above for pressure measurements based systems.

"EMBEDDED SYSTEM FOR MEASUREMENT OF WEIGHT AND OTHER PHYSICAL VARIABLES IN VEHICLES AND CONTAINERS", object of the present patent, was developed to overcome the disadvantages, drawbacks and limitations of the current systems, since the fiber-based on-board sensing system for measurement of weight is installed in a way to measure the instantaneous conditions, allowing to verify the weight of any load, be it volumes, people, liquids, animals, amongst others. In addition, the system in question allows monitoring the most relevant mechanical and structural parts of vehicles by measuring and deforming, vibrating, weight and temperature of the structural elements of the vehicle or container, with a number of advantages with regard to the integration potential of vehicles and containers. The solution proposed by the system of the present invention has a number of advantages with regard to the potential integration of vehicles and containers for the monitoring of general physical variables, does not present false sensor measurements that allow for wide multiplexing, is not based on electricity, and signal levels are high and there is no risk of electromagnetic interference, they are robust, do not suffer from water corrosion problems and do not fail due to vibration and mechanical impacts.

The following technical problems are presented by the systems that currently exist whose present invention solved:

a. One of the current proposals that use the verification of weight through sensors of the electric strain gauge type, presents technical problems of needing many cables and connections that cannot be long due to the attenuation of the electrical signal, since each element needs two conductors, are susceptible to electromagnetic interference and chemical corrosion in environments where water is present. This problem is solved with the application of optical fiber sensors that are immune to both corrosion and electromagnetic interference and can be multiplexed by hundreds in a single optical cable, significantly reducing the cables used in the sensing.

b. The current systems that use the electric strain gauge type sensors show loss of calibration over time as a function of variables such as temperature, humidity, but not limited to them, solved through the optical fiber sensors that do not need any type of power to work, the fact that they are not kept permanently attached does not interfere with their operation or calibration and maintains their parameters unchanged over dozens of years.

c. The hydraulic pressure sensors measure pressure in the shock absorbers by distributing the load sectored by the shock absorbers, do not determine the weight distribution, solved by the present patent by employing a plurality (tens to hundreds) of sensors installed in the vehicle structure obtaining extremely higher spatial resolution.

d. The hydraulic pressure sensors can exhibit micro oil leaks and loss of measurement accuracy, solved by the present patent through measurement without fluids and without use of pressure, but of deformation.

e. The size of the electric strain gauge sensors and the individual hydraulic pressure sensors are relatively large, limiting the amount used and consequently the precision in the measurement, solved through the optical fiber sensors that are miniaturized and can use hundreds of sensors obtaining extremely higher spatial resolution.

f. The configurations in the installation of the electric strain gauge sensors and the hydraulic pressure sensors are based on individual communication channels, which, in addition to generating a large number of cables, leaves the sensor elements susceptible to interruption of communication with the reading unit, when any damage occurs with its cables and connectors, solved by the present patent through the possibility of a communication network with complex configurations like ring, star, cloud, etc., which increase security with the communication channels.

Optical fiber sensors provide the following features:
- reduced size, the diameter of the optical fiber is typically in the order of 125 µm;
- immunity to electromagnetic interference, optical fiber is a dielectric material and the frequency of the electromagnetic wave in the optical domain is much higher than that of the oscillating fields generated by electric machines, by the switching of contactors and relays or by the irradiation of antennas and/or printed circuit boards;
- resistance to corrosion by water and most acids, oils and substances typically present in vehicles;
- resistance to high temperatures since the glass melting temperature is above 1,500° C.;
- are ductile and readily acquire the shape of the surfaces or bodies to which they are integrated;
- they have high tensile strengths, incomparison, they have higher tensile strength than the great majority of steels;
- They can be integrated into metallic structures through the use of glues and resins or through the direct connection to the metal by sputtering processes, melting, among others;
- They can operate remotely due to the excellent data transmission quality presented by the optical fibers, allowing the creation of optical networks with simple configurations, such as a ring or star, or advanced configurations defined by operational safety and performance;
- The signals generated by the sensors can be encoded at wavelength (frequency) which allows the multiplexing of tens to hundreds of sensor elements on the same optical fiber. This allows the monitoring system as a whole to be miniaturized; and
- They can be configured in three models: passive model, active model and active stand-alone model.

For a better understanding of the present invention the following figures are attached:

BRIEF DESCRIPTION OF THE DRAWINGS

FIG. 1 which shows the block diagram of the subsystems and constructive modules constituting the system object of the present patent;

FIG. 2 which shows the schematic view, allowing for variations according to the object to be monitored, of the installation of point sensors along the optical fiber in a container, for the measurement of variables in the generation of weight information, through the monitoring of physical variables of deformation, vibration, pressure, acceleration and temperature.

FIG. 3 which shows the schematic view, there can be variations according to the object to be monitored, from the installation of deformation sensors in container.

FIG. 4 which shows a plot of deformation behavior as a function of the physical and operational conditions of the container: "a" empty and at rest, "b" loading, "c" stacking and transport, "d" stacking, "and" loading and resting without stacking, "f" transportation.

FIG. 5 which shows the schematic view, allowing for variations according to the object to be monitored, from the installation of deformation, vibration and acceleration sensors, with high spatial density, for the purpose of measuring the weight of the load inside of the container in a distributed and consolidated way.

FIG. 6 which shows the schematic view, allowing for variations according to the object to be monitored, from the installation of sensors that measure the deformation of the container structure, which serves as the main variable for indirect measurement of weight carried by the "container".

FIG. 7 which shows the schematic view of the installation of sensors measuring the additional parameters, such as temperature, pressure, acceleration, vibration (but not limited thereto) within "containers".

FIG. 8 which shows the schematic view, there can be variations according to the object to be monitored, from the installation of optical fiber sensors that measure the parameters of the truck body, the structure and the suspension system of the vehicle, aiming the monitoring and determination of weight, temperature, vibration, pressure, acceleration and deformation.

FIG. 9 showing the schematic view, there can be variations according to the object to be monitored, from the installation of optical fiber sensors that measure the parameters of the body, the structure and the support system of the vehicle, aiming the monitoring and determination of weight, temperature, vibration, pressure, acceleration and deformation.

FIG. 10 showing the schematic view, there can be variations according to the object to be monitored, from the installation of optical fiber sensors for measurement of additional parameters, such as temperature, pressure, acceleration, vibration (but not limited to these).

DETAILED DESCRIPTION

Figure 01:
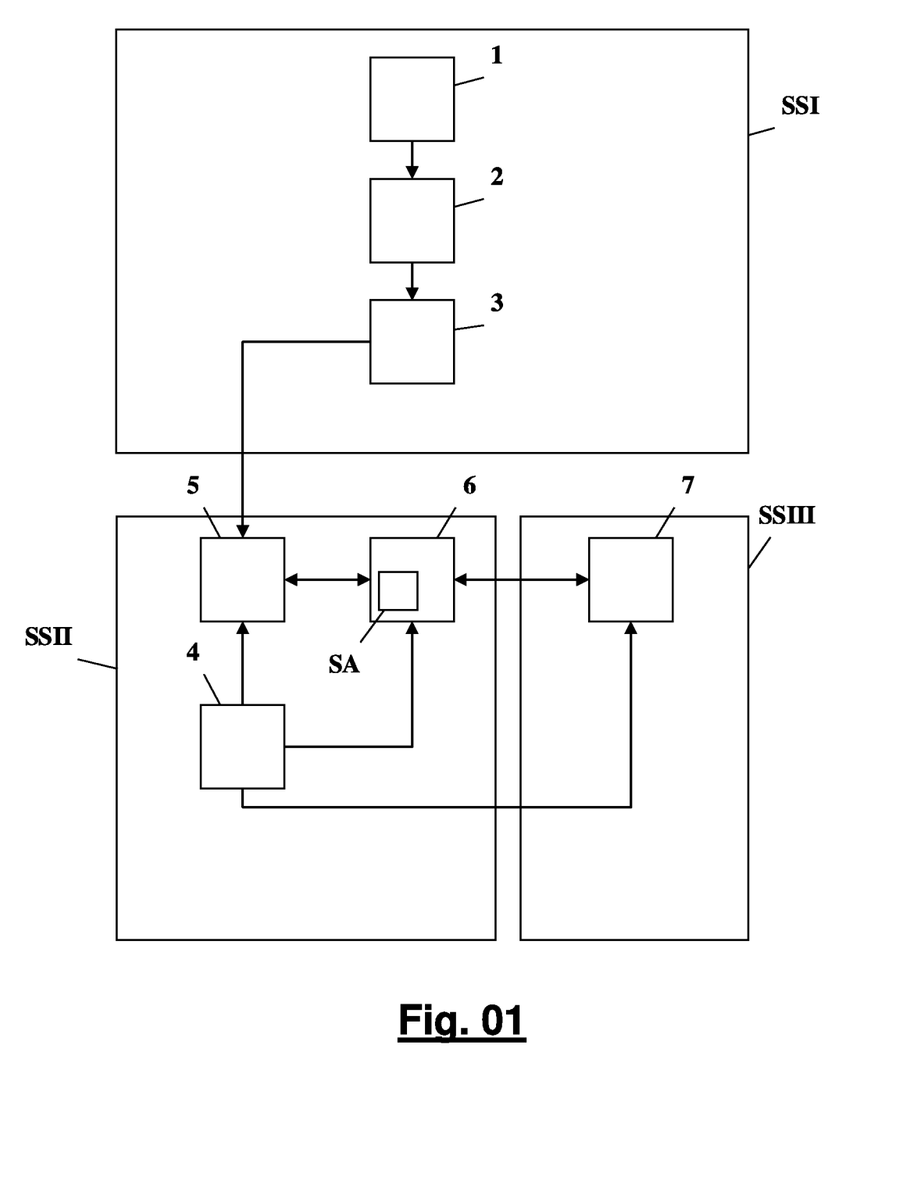

According to FIG. 1, the Embedded System for measurement of weight in vehicle and containers is a monitoring system for land vehicles, preferably cargo trucks (A) and containers (B). It consists of an external data collection subsystem (SSI) with module with sensing network (1), signal transduction module (2) and connection module (3); of a data processing and reading subsystem (SSII) with energizing module (4); reading and data acquisition module (5); processing and memory module (6); and data transmission subsystem (SSIII) with data communication module (7).

The system of the present patent monitors the variables: weight, structural wear and loss of geometry of load trucks (A) and containers (B) obtaining data of the physical variables of deformation and/or vibration and/or temperature of the structure; connected to modules specially designed to be installed in the structure of the vehicle or container for data acquisition, data transmission, data storage, data processing, data communication and decision making.

According to FIG. 1, the embedded system for measurement of weight in vehicles and containers, is interconnected by an optical fiber communication network and can operate in the following configurations: embedded systems in the passive model, active model or active and autonomous model.

The passive model (MP) uses only the external data collection subsystem (SSI) that allows the collection of information from the sensors installed in the vehicle and/or "container", through an external data collection module, where the data reported by the sensors will be punctual at the time of collection.

The active model (MA) uses the external data collection subsystem (SSI) and the data processing and reading subsystem (SSII) that allow the automatic collection of information from sensors installed in the vehicle and/or "container", that is, the data obtained by the sensors will be stored in non-volatile memory, allowing the continuous analysis of the weight transported over time, where, in this case, it is due to the external equipment, the treatment of the information collected and the calculation of the weight of the "load" and of the vehicle or container.

The autonomous active model (MAA) uses the external data collection subsystem (SSI), the data processing and reading subsystem (SSII) and the data transmission subsystem (SSIII), and allows the collection, processing, calculation of the weight of the vehicle (A) and/or the container (B) in a continuous way, where the data obtained by the sensors and the result of the weight calculation will be stored in non-volatile memory, allowing instantaneous and continuous analysis of the information and/or data will be sent to servers in the world wide web.

According to FIG. 1, the external data collection subsystem (SSI) consists of a sensing network module (1) with weight measurement sensors provided with a single or an optical fiber network operating with diffractive, spectrometric, interferometric and optical mirroring in domain of time and/or frequency, pulsed or continuous, unidirectionally connected to the signal transduction module (2) and unidirectionally connected to the connection module (3); signal transduction module (2) provided with optical fibers which confine and guide the optical signal with the information generated in the weight sensors and connected unidirectionally to the connection module (3) and to the module with sensing network (1); connection module (3) provided with a coupler and/or multiplexer of the circulator type or wavelength multiplexer or couplers having coupling ratios of 1×99, 10×90 or 50×50, with three or more ports, or the like and unidirectionally connected to the module reading and acquisition of data (5) and to the signal transduction module (2); subsystem for data processing and reading (SSII) with energizing module (4) of the linear or switched type or similar type connected to the data reading and acquisition module (5), to the processing and memory module (6), and to the data communication module (7); data reading and acquisition module (5) endowed with laser-type or refractive or interferometric-type optical reader or similar, with light sources of the type laser, LED, superluminescent LED, ASE or similar, with detectors such as photodiodes, valves, thermopiles, pyroelectric sensors, CCDs and the like and connected bidirectionally to the processing and memory module (6) and unidirectionally connected to the connection module (3) and to the energizing module (4); processing and memory module (6) with an Intel i3 or similar processor and with analysis software (SA) recorded and connected bidirectionally to the reading module (5) and to the data communication module (7) and unidirectionally to the energizing module (4); and a data transmission subsystem (SSIII) with a data communication module (7) endowed with a cellular phone modem, with GPRS or higher data transfer rate mobile service, with wireless or wired networks and connected bidirectionally to the processing and memory module (6) and unidirectionally to the power module (4).

The connection module (3) consists of connectors for optical fibers connecting the subsystem (SSI) to the subsystem (SSII) and allowing the operation of the passive model (MP) where only optical and passive components are installed in the vehicle or container.

The data acquisition and reading module (5) comprises components for detecting and converting optical signals of intensity and frequencies, modulated or not, into electrical signals.

The processing and memory module (6) consists of a microcontroller of at least 12 bits and a memory module with at least 100 MB of RAM.

The communication system module (7) connects to the cloud for data transmission and receiving of information on configuration and transfers and receives the vehicle/container information to the existing reading and communications subsystems, on the road, on receiving antennas, in wireless data collection and sending systems, and through the exchange of data and text messages or voice over Internet Protocol (IP) messages, between the subsystems embedded in the other vehicles that make up the network.

FIGS. 2 to 10 show concepts related to the integration of optical fiber sensors (S) to the structure of containers (B) and to vehicles for the monitoring of variables of interest, as described above.

FIGS. 2 to 10 present concepts of the installation of sensors in a container (B) and/or in the tow of a transport vehicle and also indicate how the parameters can be acquired. In all concepts, the sensors are interconnected by optical fiber communication network that can operate either in the configurations of the systems in the passive (MP), active (MA) or active and autonomous (MAA) models.

Figure 02:
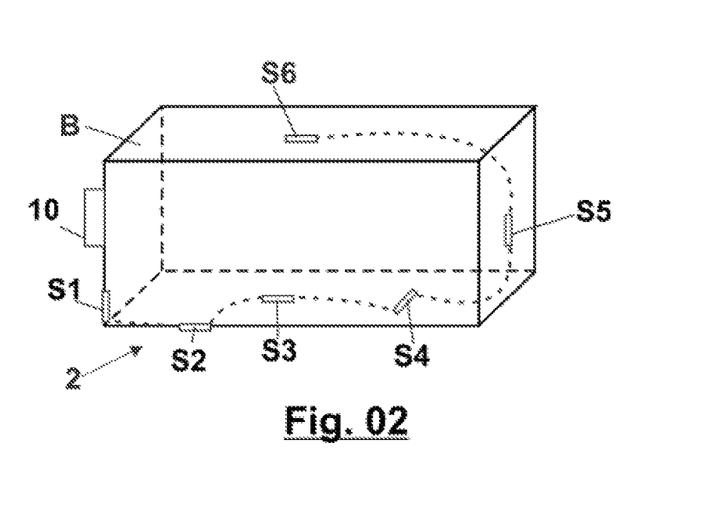

FIG. 2 shows the application of punctual sensors based on optical fiber (S1, S2, S3, S4, S5 and S6) installed in a container or in a trucking trailer. Deformation, pressure, vibration and temperature sensors are installed in a quasi-distributed architecture in points of interest to monitor the load. These sensors are interconnected by optical fiber network and can withstand from tens to hundreds of measuring elements and that connects with the measuring subsystems through the connection module (3).

Figure 03:
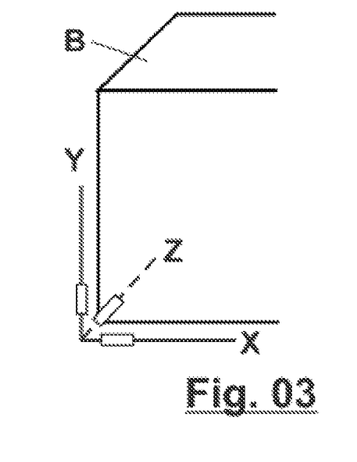

FIG. 3 shows a schematic representation of the deformation, pressure and/or vibration sensors in a tri-axial configuration, indicating the flexibility in the measurement in the 3 axes of the space, generating more precise parameters for the determination of container weight (B) or transport vehicle.

Figure 04:
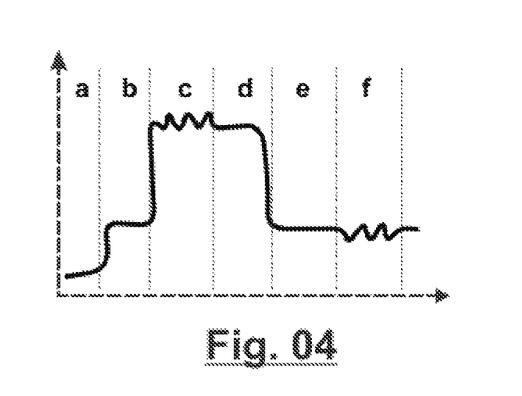

FIG. 4 shows an example of measurements made by a deformation sensor installed in the truck or container structure (B). In the vertical axis, the intensity of the deformation signal is informed and in the horizontal axis the time. The regions from (a) to (f) indicated in the graph correspond to different moments of the operation involving the transport of loads:
  a) vehicle or container (B) unloaded and at rest.
  b) vehicle or container (B) partially loaded and at rest.
  c) vehicle or container (B) fully loaded and moving.
  d) vehicle or container (B) fully loaded and at rest.
  e) vehicle or container (B) partially loaded and at rest.
  f) vehicle or container (B) partially loaded and moving.

With the information generated by the sensors it is possible to reconstruct the history of loading, displacement and discharge to which the vehicle (A) or container (B) has been submitted.

Figure 05:
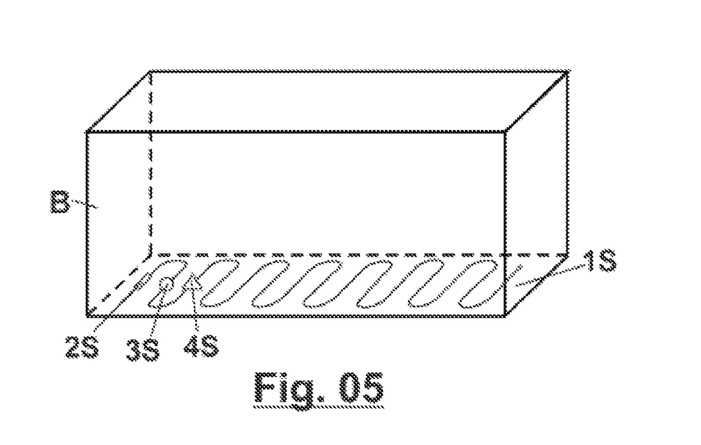

FIG. 5 shows an example of monitoring dedicated only to the floor of the vehicle or container (B). In this example two different modes of optical fiber sensors are employed, point sensors that can be multiplexed along the fiber (2S, 3S and 4S) that can measure deformation, pressure, vibration and temperature, and distributed sensors. The installation of the proposed system can either be done directly in the container structure (B) or be independent to the container and optimized to interact with the load. In this configuration it is foreseen the installation of a network with high density of optical sensors measuring different parameters, such as deformation, vibration, pressure and temperature. The network consists of optical fiber, and optical fiber sensors, and therefore can mimic the geometry of interest, in this case, the floor of the container. With this type of installation it is possible to measure from tens to hundreds of parameters simultaneously and, with proper calibration and processing, extract absolute and relative information of low and high temporal frequency with high spatial density of the physical state of the structure of the floor, walls or roof, of the "container" and/or, on a single way, the load on the floor. Due to the spatial density of the sensors and to the diversity of the information simultaneously monitored, it is possible to determine the distribution of the load along the floor of the container and to measure the weight in a distributed way. The installation of deformation sensors (2S), vibration (3S) and temperature (4S), with high spatial density, aiming to measure the weight of the load inside the container in a distributed and consolidated way. The element (1S) consists of a optical fiber cable for connection of the sensing elements.

Figure 06:
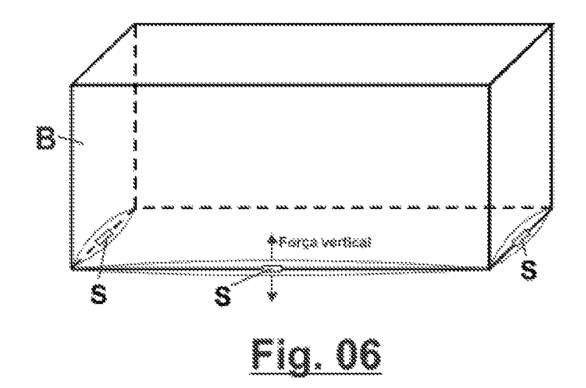

FIG. 6 shows in a schematic way the structural deformation to which the container is subjected and the installation of optical fiber sensors to (S) detect information of physical quantities, which would serve as the main variable for indirect measurement of weight carried by the container.

Figure 07:
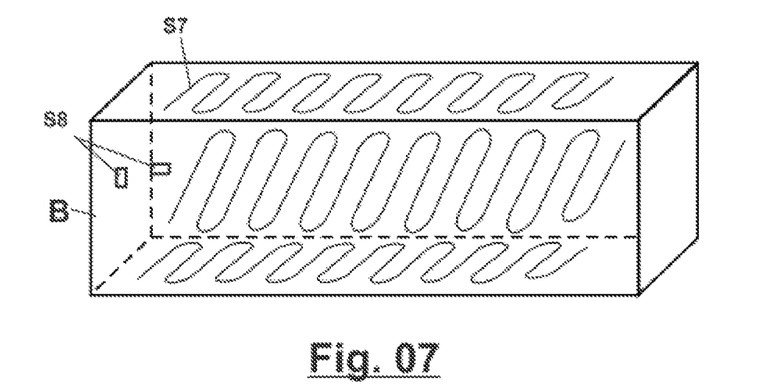

FIG. 7 shows a more complete version than that introduced in FIG. 5, where all the walls of the container (B) are monitored by a network of distributed optical fibers (S7) and also by point sensors (S8) in regions of interest, measuring the strain, pressure, vibration and temperature variables.

From the measurements of the physical variables of deformation, vibration, pressure and temperature of the structure of the container (B), it is possible to infer all the loads to which the containers (B) are subjected when at rest or transported. For example: the weight of the load inside it, the weight distribution inside it, ambient temperature variations, the mechanical stress on the container (B) structure, acceleration and deceleration effects due to container transport (B) in trucks, ships or planes, amongst others.

It is important to note that vibration information must also depend on the mass contained in the "container". Thus, the simultaneous measurement of these quantities, together with the deformation distributed in several points of the structure, should help in determining the weight of the container in the various operating conditions to which it is subjected.

Figure 08:
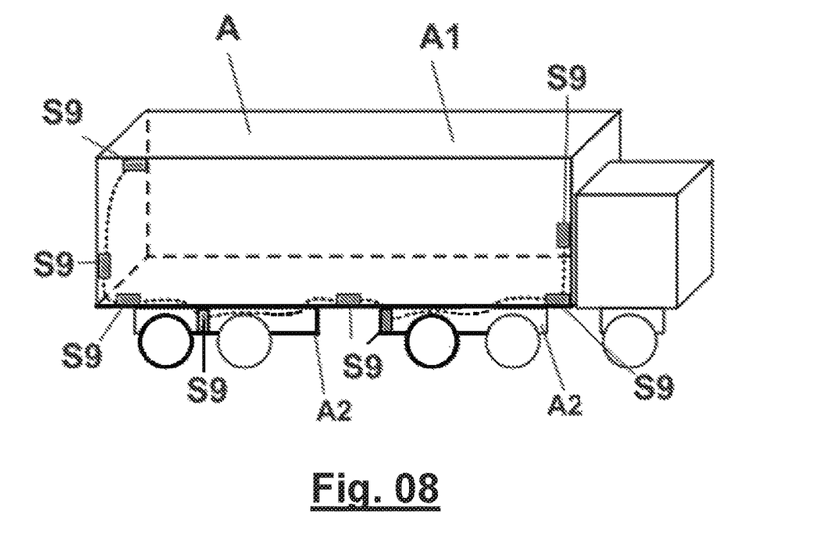
Figure 09:
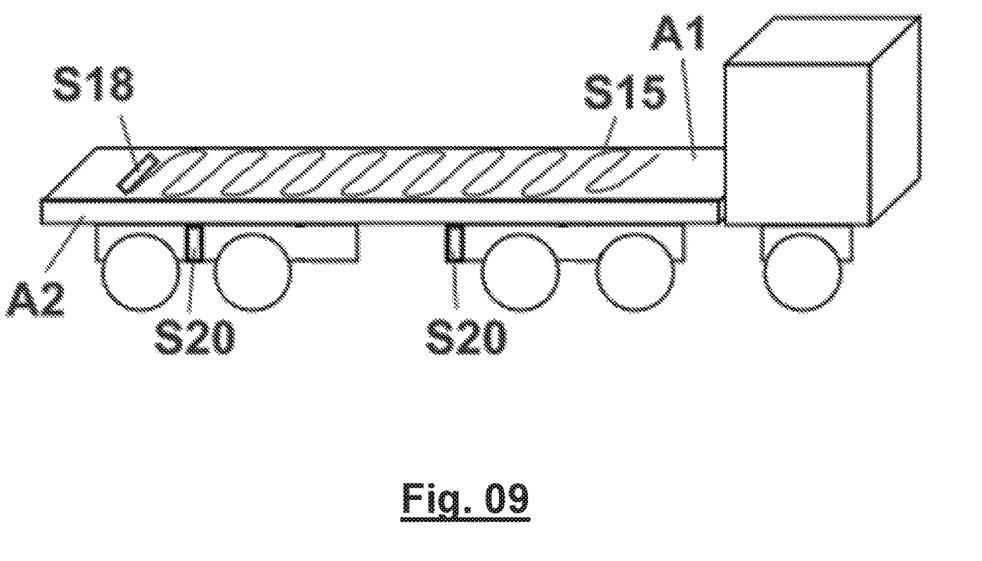
Figure 010:
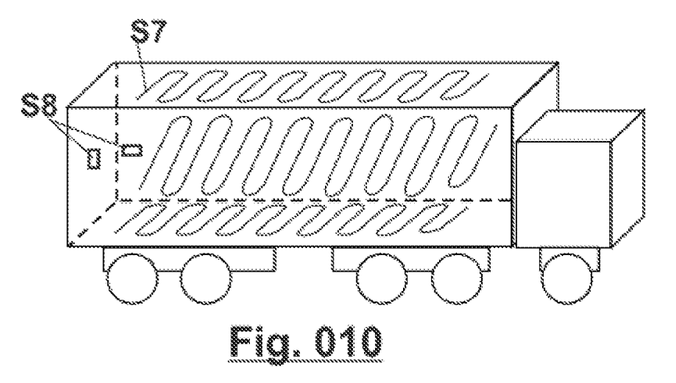

FIGS. 8 and 9 represent the integration of optical fiber sensors into medium and large load vehicles with the main purpose of determining the weight of the load carried by the vehicle. The two concepts proposed in these figures are generic and can be adapted from the information shown in the figures according to the needs of each type of vehicle and/or load. In both concepts, the sensors are interconnected by optical fiber communication network that can operate in the configurations of the embedded systems in the passive, active, or active and autonomous model.

In the FIG. 8, is shown the first concept where the vehicles with body in the box format are considered, and in FIG. 9 the second concept is presented for vehicle with low body (plank, but not limited to them).

For the first concept embedded on the truck (A) are evidenced: the box-type truck body (A1); the suspension system (A2); the sensor measuring the load variables (S9); the sensors measuring the deformation of the body (S9) and (S9); the sensors measuring the deformation of the body strut (S9).

For the second concept (FIG. 9) Embedded on the truck (A) are evidenced: the body (A1); the vehicular suspension system (A2); the optical fiber network (S15); sensors measuring deformation, measuring vibration and pressure, deformation of the body suspension system and vibration of the body suspension system (S18).

The information measured by the sensors is processed using dedicated software to transform the deformation, pressure, vibration and temperature data into weight. The software workflow follows the sequence below:

i. Conversion of optical and electrical quantities in information of deformation, pressure, vibration and temperature;

ii. Integration of the information of the sensors to the dimensions of the container or vehicle to determine the structural, static and dynamic variations of the vehicles and containers;

iii. Determination of the distributed and total load weight; and iv. Data storage of weight and data transmission to the communication network, according to the application model.

The method of monitoring the vehicles is comprised of using deformation, pressure, vibration and temperature sensors; that allow the monitoring and analysis of the internal or external areas of the vehicle and/or the container, according to its characteristic and purpose, that is, the monitoring of the load weight inside vehicles and containers.

According to the method, all monitoring sensors have the ability to operate in an integrated way between them or independently, allowing greater flexibility and suitability to various forms of use and connection with the external reading devices and controllers.

According to the method, the system allows the monitoring of the entire structure and of the physical components, allowing to verify the weight of any type of products, liquids, animals, people, amongst others, that are at rest or transported in vehicles or containers, with the following functions:

On-board weight measurement by structural analysis of the vehicle body or container body;

Measurement of vehicle weight distribution;

Measurement of the dynamic behavior of the load through the structural response of the vehicle to loading and motion;

Measurement of parameters on the risk of rollover;

Measurement of structural changes of the vehicle due to changes in response to loading.

The operation of the system of the present patent is as follows: the module with sensing network (1), monitors the structure of the vehicle or container, collecting the point or distributed information of temperature, vibration, deformation and pressure; the signal transduction module (2) confines and guides the optical signal with the information generated in the sensors; the connection module (3) couples and/or multiplexes the received signal; the data acquisition and reading module (5) optically reads the received signal and transforms it into an electronic signal and transmits and receives information with the processing and memory module (6); the processing and memory module (6) processes the information, executes the software, stores data in memory and distributes the information with the communication system module (7); and the communication system module (7) connects to the cloud for data transmission and receives configuration information and transfers and receives the vehicle/container information to the existing read and communications subsystems, in the the lane, in the receiving antennas, in the data collection and data sending wireless systems, and through the exchange of data and text or voice messages over Internet Protocol (IP), between the subsystems that are embedded in the other vehicles that make up the network.

With the information monitored and measured by the sensors in their different configurations, it is possible to infer the weight of the load in static or dynamic form, located or distributed.

In addition to allowing continuous and instantaneous monitoring of the transported weight, the measurement and monitoring system can comprehend the vast majority of problems, which can lead to accidents. Among them we can mention:

In addition, the system in question by means of optical fiber sensors allows monitoring of the most relevant mechanical and structural parts of the vehicles, being (but not limited to): the propulsion system and/or power system, the lift system, the exhaust system and the steering and braking system, especially with regard to aspects of safety and collision risk reduction as well as fuel and tires saving.

The system allows the monitoring and analysis of the internal or external areas of the vehicle and/or the container, according to its characteristic and purpose, i.e.:
monitoring the physical factors of the load;
monitoring of environmental factors; and
monitoring of operational aspects.

General sensing monitors the propulsion and/or force systems, collecting point or distributed information on temperature, vibration, power, friction on parts, acceleration, wear, and fuel oil pressure.

General sensing monitors the lift system, collecting point or distributed tire pressure information, damper integrity, temperature, vibration, deformation, bending, and shock absorption.

General sensing monitors the exhaust system, collecting point or distributed temperature information.

General sensing, monitoring the steering and braking system, collecting point or distributed information on temperature, brakes, friction, effectiveness time, steering gearbox oil temperature, wear and vibration.

The invention claimed is:

1. An embedded system for measurement of weight in vehicles and containers, characterized by, external data collection subsystem (SSI) being constituted of a sensing network module (1) with weight measurement sensors provided with a single or an optical fiber network operating with diffractive, spectrometric, interferometric and optical mirroring in domain of time and/or frequency, pulsed or continuous, unidirectionally connected to the signal transduction module (2) and unidirectionally connected to the connection module (3); a signal transduction module (2) provided with optical fibers which confine and guide the optical signal with the information generated in the weight sensors and connected unidirectionally to the connection module (3) and to the module with sensing network (1); a connection module (3) provided with coupler and/or multiplexer of the circulator type or wavelength multiplexer or couplers having coupling ratios of 1×99, 10×90 or 50×50, with three or more ports or the like and unidirectionally connected to the module reading and acquisition of data (5) and to the signal transduction module (2); subsystem for data processing and reading (SSII) with energizing module (4) of the linear or switched type connected to the data reading and acquisition module (5), to the processing and memory module (6), and to the data communication module (7); data reading and acquisition module (5) endowed with laser-type or refractive or interferometric-type optical reader, with light sources of the type laser, LED, superluminescent LED, or ASE, with detectors such as photodiodes, valves, thermopiles, pyroelectric sensors, CCDs and the like and connected bidirectionally to the processing and memory module (6) and unidirectionally connected to the connection module (3) and to the energizing module (4); processing and memory module (6) with a processor and with analysis software (SA) recorded and connected bidirectionally to the reading module (5) and to the data communication module (7) and unidirectionally to the energizing module (4); and a data transmission subsystem (SSIII) with a data communication module (7) endowed with a cellular phone modem, with GPRS or higher data transfer rate mobile service, with wireless or wired networks and connected bidirectionally to the processing and memory module (6) and unidirectionally to the power module (4).

2. The embedded system for measurement of weight in vehicles and containers, according to claim 1, characterized by, adopting models chosen between passive model (MP) that uses only the external data collection subsystem (SSI); active model (MA) that uses the external data collection subsystem (SSI) and the data processing and reading subsystem (SSII) that allow the automatic collection of information from sensors installed in the vehicle and/or "container"; and the autonomous active model (MAA) that uses the external data collection subsystem (SSI), the data processing and reading subsystem (SSII) and the data transmission subsystem (SSIII), and allows the collection, processing, calculation of the weight of the vehicle (A) and/or the container (B) in a continuous way, where the data obtained by the sensors and the result of the weight calculation will be stored in non-volatile memory, allowing instantaneous and continuous analysis of the information and/or data will be sent to servers in the internet.

3. The embedded system for measurement of weight in vehicles and containers, according to claim 1, characterized by, punctual sensors for deformation, pressure, vibration and temperature installed in a quasi-distributed architecture in points of interest to monitor the load and interconnected by optical fiber network and that can withstand from tens to hundreds of measuring elements and that connects with the measuring subsystems through the connection module (3).

4. The embedded system for measurement of weight in vehicles and containers, according to claim 1, characterized by, sensors for deformation, pressure and/or vibration in a tri-axial configuration, indicating the flexibility in the measurement in the 3 axes of the space, generating more precise parameters for the determination of container weight (B) or transport vehicle.

5. The embedded system for measurement of weight in vehicles and containers, according to claim 1, characterized by, measuring from tens to hundreds of parameters simultaneously and, with proper calibration and processing, extract absolute and relative information of low and high temporal frequency with high spatial density of the physical state of the structure of the floor, walls or roof, of the "container" and/or, on a single way, the load on the floor and to determine the distribution of the load along the floor of the container and in this way to measure the weight in a distributed way.

6. The embedded system for measurement of weight in vehicles and containers, according to claim 1, characterized by, from the measurements of deformation, vibration, pressure and temperature of the structure of the container (B), to be possible to infer all the weights of the load inside it, the weight distribution inside it, ambient temperature variations, the mechanical stress on the container (B) structure, acceleration and deceleration effects due to container (B) transport in trucks, ships or planes, amongst others, to which the containers (B) are subjected when at rest or transported.

7. A process of the embedded system for measurement of weights in vehicles and containers, according to claim 1, characterized by, software operational workflow with the following sequence:
- converting optical and electrical quantities in information of deformation, pressure, vibration and temperature;
- determining the structural, static and dynamic variations of the vehicles and containers by integrating the information of the sensors to the dimensions of the container or vehicle;
- determining the distributed and total load weight; and
- storing the weight data and transmitting the weight data with the communication network, according to the application model.

8. The process of operation of the embedded system for measurement of weights in vehicles and containers, according to claim 7, characterized by, the following sequence: the module with sensing network (1), monitoring the structure of the vehicle or container, collecting the point or distributed information of temperature, vibration, deformation and pressure; the signal transduction module (2) confining and guiding the optical signal with the information generated in the sensors; the connection module (3) coupling and/or multiplexing the received signal; the data acquisition and reading module (5) optically reading the received signal and transforming it into an electronic signal and transmitting and receiving information with the processing and memory module (6); the processing and memory module (6) processing the information, executing the software, storing data in memory and distributing the information with the communication system module (7); and the communication system module (7) connecting to the cloud for data transmission and receiving configuration information and transferring and receiving the vehicle/container information to the existing read and communications subsystems, in the lane, in the receiving antennas, in the data collection and data sending wireless systems, and through the exchange of data and text or voice messages over Internet Protocol (IP), between the subsystems that are embedded in the other vehicles that make up the network.

9. The process of operation of the embedded system for measurement of weight in vehicles and containers, according to claim 7, characterized by, punctual sensors for deformation, pressure, vibration and temperature installed in a quasi-distributed architecture in points of interest monitoring the load and interconnected by optical fiber network and that can withstand from tens to hundreds of measuring elements and connecting with the measuring subsystems through the connection module (3).

10. The process of operation of the embedded system for measurement of weight in vehicles and containers, according to claim 7, characterized by, sensors for deformation, pressure and/or vibration in a tri-axial configuration, indicating the flexibility in the measurement in the 3 axes of the space, generating more precise parameters for the determination of container weight (B) or transport vehicle.

11. The process of operation of the embedded system for measurement of weight in vehicles and containers, according to claim 7, characterized by, measuring from tens to hundreds of parameters simultaneously and, with proper calibration and processing, extracting absolute and relative information of low and high temporal frequency with high spatial density of the physical state of the structure of the floor, walls or roof, of the "container" and/or, on a single way, the load on the floor and determining the distribution of the load along the floor of the container and in this way measuring the weight in a distributed way.

12. The process of operation of the embedded system for measurement of weight in vehicles and containers, according to claim 7, characterized by, from the measurements of the physical variables of deformation, vibration, pressure and temperature of the structure of the container (B), being possible to infer all the weights of the load inside it, the weight distribution inside it, ambient temperature variations, the mechanical stress on the container (B) structure, acceleration and deceleration effects due to container (B) transport in trucks, ships or planes, amongst others, to which the containers (B) are subjected when at rest or transported.

13. The process of operation of the process of operation of the embedded system for measurement of weights in vehicles and containers, according to claim 7, characterized by, the following sequence: the module with sensing network (1), monitoring the structure of the vehicle or container, collecting the point or distributed information of temperature, vibration, deformation and pressure; the signal transduction module (2) confining and guiding the optical signal with the information generated in the sensors; the connection module (3) coupling and/or multiplexing the received signal; the data acquisition and reading module (5) optically reading the received signal and transforming it into an electronic signal and transmitting and receiving information with the processing and memory module (6); the processing and memory module (6) processing the information, executing the software, storing data in memory and distributing the information with the communication system module (7); and the communication system module (7) connecting to the cloud for data transmission and receiving configuration information and transferring and receiving the vehicle/container information to the existing read and communications subsystems, in the lane, in the receiving antennas, in the data collection and data sending wireless systems, and through the exchange of data and text or voice messages over Internet Protocol (IP), between the subsystems that are embedded in the other vehicles that make up the network.

* * * * *